United States Patent [19]

Matsuki et al.

[11] Patent Number: 4,731,845
[45] Date of Patent: Mar. 15, 1988

[54] DEVICE FOR LOADING A PATTERN RECOGNIZER WITH A REFERENCE PATTERN SELECTED FROM SIMILAR PATTERNS

[75] Inventors: Tomoko Matsuki; Hideo Tanaka, both of Tokyo, Japan

[73] Assignee: NEC Corporation, Tokyo, Japan

[21] Appl. No.: 632,492

[22] Filed: Jul. 19, 1984

[30] Foreign Application Priority Data

Jul. 21, 1983 [JP] Japan .................................. 58-133313

[51] Int. Cl.⁴ ............................................. G10L 5/00
[52] U.S. Cl. ................................................... 381/43
[58] Field of Search ................................. 381/40–50; 364/513.5; 382/1, 10, 30, 34, 36, 33

[56] References Cited

U.S. PATENT DOCUMENTS

| | | | |
|---|---|---|---|
| 3,592,969 | 7/1971 | Yoshino | 381/45 |
| 3,816,722 | 6/1974 | Sakoe | 381/43 |
| 3,864,518 | 2/1975 | Kalfaian | 381/45 |
| 4,059,725 | 11/1977 | Sakoe | 381/43 |
| 4,060,694 | 11/1977 | Suzuki et al. | 381/45 |
| 4,292,471 | 9/1981 | Kahn et al. | 382/36 |
| 4,297,528 | 10/1981 | Beno | 381/45 |
| 4,403,114 | 9/1983 | Sakoe | 381/42 |
| 4,601,054 | 7/1986 | Watari et al. | 381/42 |

Primary Examiner—Emanuel S. Kemeny
Attorney, Agent, or Firm—Sughrue, Mion, Zinn, Macpeak & Seas

[57] ABSTRACT

One reference pattern is selected from three spoken repetitions of the same utterance, the one selected having the highest calculated similarity to the other two, thereby being the most representative.

3 Claims, 1 Drawing Figure

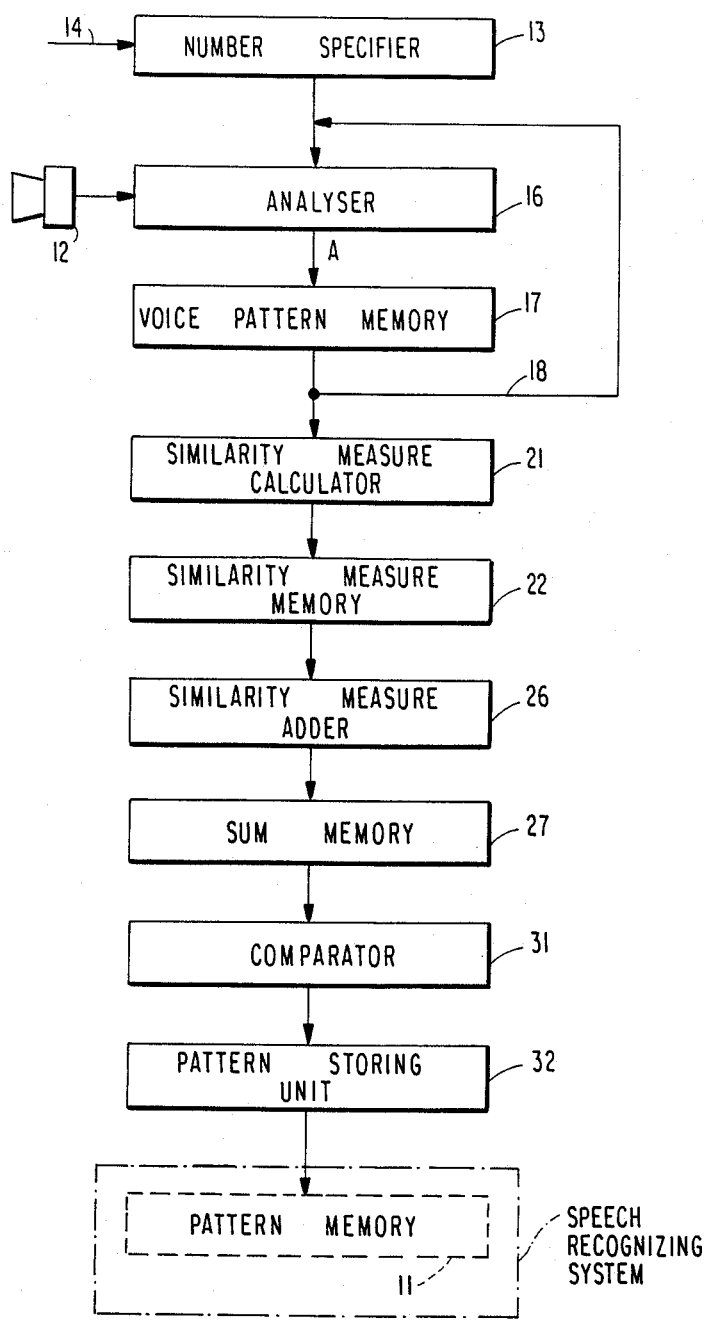

DEVICE FOR LOADING A PATTERN RECOGNIZER WITH A REFERENCE PATTERN SELECTED FROM SIMILAR PATTERNS

BACKGROUND OF THE INVENTION

This invention relates to a pattern storing device for use in storing a reference pattern in a pattern memory of a pattern recognizing system.

Pattern recognizing systems are described in a number of papers and are already in practical use. Examples are disclosed, for example, in a specification of U.S. Pat. No. 3,816,722 issued to Hiroaki Sakoe et al and in specifications of U.S. Pat. Nos. 4,049,913 and 4,059,725, both issued to Hiroaki Sakoe. Many of the practically used pattern recognizing systems are operable based on the pattern matching technique as called in the art with application thereto of the dynamic programming algorithm used in various fields of the art.

A pattern recognizing system recognizes an input pattern as one of a plurality of reference patterns and comprises a pattern memory for memorizing the reference patterns, a similarity measure calculator for calculating a similarity measure between the input pattern and each of the reference patterns, and a selector for selecting that one of the reference patterns as a result of recognition of the input pattern for which the similarity measure is an extremum of the similarity measures calculated between the input pattern and the respective reference patterns. The process carried out by the similarity measure calculator and the selector, is called the pattern matching. Each similarity measure is represented either by a degree of similarity or by a degree of dissimilarity as will later be described at some length. It naturally follows that the extremum should be a maximum and a minimum when the similarity measure is given by the similarity and the dissimilarity, respectively.

Such a pattern recognizing system is typically a speech recognizing system for recognizing speech. More particularly, a speech recognizing system is for recognizing an input pattern given by voice of either discretely or continuously spoken words. The present invention will therefore be described in conjunction with a speech recognizing system, which will be referred to briefly as a speech recognizer. The pattern storing device is accordingly called a voice storing device.

On putting a speech recognizer into operation, it is necessary to use a voice storing device in preliminarily storing or registering voice patterns in the pattern memory as the reference patterns. Each voice pattern represents a word or a succession of several words actually uttered or spoken by a person whose utterance should later be recognized.

If a failure occurs in the utterance for storage or registration of a reference pattern, speech recognition becomes impossible even though the utterance is repeated a number of times for recognition. Furthermore, the utterances are different in most cases if uttered by a single person for a single word. This results in a difficulty in the recognition as is the case with presence of a failure in the utterance for storage. In such cases, it is not easy to find out that the trouble has resulted in recognition from problems in the utterance for storage. When the trouble could anyhow be found to result from occurrence of a failure in the utterance for storage, it is necessary to store the reference pattern afresh. Repetition of the storage is troublesome. Moreover, another failure may arise in the utterance for the fresh storage.

For a speaker recognizing or discriminating system of the type described and revealed in a specification of U.S. Pat. No. 4,403,114 issued to Hiroaki Sakoe, it may be that the persons who speak to the system for identification should preliminarily be trained as regards utterance before storage of the reference patterns for the respective persons. The training is effective not only in storing excellent reference patterns in the system but also in raising the accuracy of identification of the respective persons. The training is, however, undesirable for speech recognizers of simpler types.

It will be understood from the above that a conventional voice storing device is objectionable in that a failure in the utterance for storage gives rise to difficulties in operation of the speech recognizer and in that training as regards the utterance for storage is necessary if the failures should be got rid of. This is also the case with a pattern storing device which is for patterns other than the voice patterns and is operable in response to formation of a pattern, such as a hand-printed letter, for storage.

SUMMARY OF THE INVENTION

It is therefore an object of the present invention to provide a pattern storing device by which it is possible to store a reference pattern in a pattern recognizing system without the necessity of preliminary training as regards formation of a pattern for storage.

It is another object of this invention to provide a pattern storing device of the type described, by which it is rendered unnecessary to carry out storage afresh even in the presence of a failure in formation of the pattern.

It is still another object of this invention to provide a pattern storing device of the type described, by which it is possible to store an excellent reference pattern in a pattern recognizing system even in the presence of a failure in formation of the pattern.

According to this invention, there is provided a pattern storing device which is for storing a reference pattern in a pattern memory of a pattern recognizing system and comprises pattern memory means for memorizing those at least three patterns as memorized patterns from which the reference pattern should be selected, similarity measure calculating means for calculating similarity measures for each of the memorized patterns relative to others thereof, respectively, sum calculating means for calculating a sum of the similarity measures calculated for each of the memorized patterns, and selecting means responsive to the sums calculated for the memorized patterns, respectively, for selecting that one of the memorized patterns as the reference pattern for which the sum is an extremum of the sums calculated for the memorized patterns.

BRIEF DESCRIPTION OF THE DRAWING

The single FIGURE shows a block diagram of a voice storing device according to an embodiment of the instant invention together with a pattern memory of a speech recognizer.

DESCRIPTION OF THE PREFERRED EMBODIMENTS

Referring to the sole FIGURE, a voice storing device is a pattern storing device according to a preferred embodiment of the present invention and is for use in storing or registering a voice pattern as a reference pattern in a pattern memory 11 of a speech recognizer in response to a voice input uttered or spoken to a microphone 12 at least three times. At least three voice inputs successively given to the microphone 12, are representative of a single word or a single succession of several words and are therefore similar to one another.

The voice storing device comprises a number specifier 13 which is manually adjustable as indicated by an arrow 14. The number specifier 13 specifies the number of voice inputs which should be processed into a single reference pattern for storage in the pattern memory 11. Merely for convenience of description, it will be assumed that the number specified by the number specifier 13 is four. In this event, the voice storing device deals with four voice inputs successively supplied to the microphone 12 as first through fourth voice inputs and stores a reference pattern in the pattern memory 11.

Each voice input is delivered as an electrical signal from the microphone 12 to an analyser 16. Responsive to the electrical signal, the analyser 16 produces a voice pattern A of the type described in the above-referenced specifications of U.S. patents. The analyser 16 may be what is described in the above-cited specification of Sakoe et al patent with reference to FIG. 11 thereof. At any rate, operation of the analyser 16 will briefly be described in the following for completeness of the disclosure.

The analyser 16 comprises a bank of band-pass filters (not shown) of different frequency bands. It will be assumed that the filter bank consists of sixteen band-pass filters. Responsive to the electrical signal, the band-pass filter bank produces sixteen band-divided outputs. Each band-divided output is rectified and then caused to pass through a low-pass filter (not shown). Sixteen filter outputs thereby obtained, are subjected to analog-to-digital conversion at a frame period of about 20 milliseconds. As a result, the voice pattern A is given by a time sequence of feature vectors as follows:

$$A = a_1, a_2, \ldots, a_i, \ldots, a_I, \quad (1)$$

where I represents a duration of the electrical signal, namely, of the voice pattern A, in terms of the frame period. An i-th feature vector $a_i$ is given by sixteen vector components ($a_{i1}, a_{i2}, \ldots, a_{i16}$), the number of components being equal to that of the band-pass filters. It should be noted that each feature vector is represented herein by a usual or Roman letter rather than by a bold letter or a usual letter with an arrow thereover.

Such voice patterns are successively produced by the analyser 16 in response to the first through the fourth voice inputs and are temporarily stored in a voice pattern memory 17 as first through fourth memorized patterns A1, A2, A3, and A4, respectively. As soon as each voice pattern is memorized in the voice pattern memory 17, a signal is fed back through a signal line 18. The signal indicates that a next voice input can be given to the microphone 12. The signal may furthermore be used in making the number specifier 13 indicate that it is no longer necessary to supply another voice input to the microphone 12 when the voice input is given thereto four times.

A similarity measure calculator 21 is for calculating a similarity measure between each pair or combination of the first through the fourth memorized patterns A1 to A4. In other words, the similarity measure calculator 21 successively calculates similarity measures for each of the memorized patterns A1 through A4 relative to others thereof, respectively. Each similarity measure may be a correlation coefficient representative of the similarity between two patterns or a distance representative of the dissimilarity therebetween.

Preferably, each similarity measure is calculated according to the dynamic programming algorithm with the use of a mapping or warping function and also of an adjustment window as described in the above-referenced specifications of U.S. patents. The calculation is described also in an article contributed by Hiroaki Sakoe et al to IEEE Transactions on Acoustics, Speech, and Signal Processing, Vol. ASSP-26, No. 1 (February 1978), pages 43 to 49, under the title of "Dynamic Programming Algorithm Optimization for Spoken Word Recognition" and another article contributed by Hiroaki Sakoe to Vol. ASSP-27 of the Transactions, No. 6 (December 1979), pages 588 to 599, under the title of "Two-Level DP-Matching—A Dynamic Programming-Based Pattern Matching Algorithm for Connected Word Recognition." The dynamic programming algorithm makes it possible to drastically reduce the amount of calculation and to calculate the similarity measure substantially in the real time fashion. The adjustment window is for further reducing the amount of calculation. The mapping function is for adjusting the time sequences for the pattern matching.

Calculation of a similarity measure will briefly be described in the following by using a distance between first and second patterns A and B. Let the first pattern A be represented by Equation (1) above and each feature vector, by sixteen vector components in the manner described before. The second pattern B is similarly represented by a time sequence of feature vectors as:

$$B = b_1, b_2, \ldots, b_j, \ldots, b_J,$$

where J represents a duration of the second pattern B. A j-th feature vector $b_j$ has sixteen vector components ($b_{j1}, b_{j2}, \ldots, b_{j16}$). An elementary distance $d(i, j)$ between the i-th and the j-th feature vectors $a_i$ and $b_j$ is given by:

$$d(i, j) = \| a_i - b_j \|$$
$$= \sum_{k=1}^{16} |a_{ik} - b_{jk}|.$$

In order to distinguish from the elementary distance $d(i, j)$, the distance between the patterns A and B will now be called an overall or matching distance and denoted by $D(A, B)$. According to the dynamic programming algorithm, the overall distance $D(A, B)$ is obtained by iteratively calculating a recurrence formula. Inasmuch as attention is directed to speech recognizers of simple types, the recurrence formula may be:

$$g(i, j) = d(i, j) + \min[g(i-1, j), g(i-1, j-1), g(i-1, j-2)], \quad (2)$$

where $g(i, j)$ will be named a recurrence coefficient. The recurrence formula (2) may iteratively be calculated from a starting point $(i, j) = (1, 1)$ up to an end point $(i, j) = (I, J)$ along the mapping function and by the use of the adjustment window. The overall distance $D(A, B)$ is given by the recurrence coefficient $g(I, J)$ for the end point $(I, J)$.

If the first through the fourth voice inputs are one and the same, the distances for all combinations of the memorized patterns A1 through A4 are equal to zero. It is, however, usual as described above that the voice inputs are not exactly identical. The distances calculated for the first through the fourth memorized patterns A1 to A4 are exemplified in a matrix form in a Table which will be shown hereunder. The distance between one of the memorized patterns A1 through A4 and the same memorized pattern, is equal to zero and need not be calculated. Such distances are indicated in the Table by hyphens.

TABLE

|    | A1 | A2 | A3 | A4 | Sums of Matching Distances | |
|----|----|----|----|----|----|----|
| A1 | — | 10 | 11 | 12 | D1 | 33 |
| A2 | 10 | — | 12 | 13 | D2 | 35 |
| A3 | 11 | 12 | — | 14 | D3 | 36 |
| A4 | 12 | 13 | 14 | — | D4 | 39 |

The overall distances D(A, B) are temporarily stored in a similarity measure memory 22 as memorized similarity measures. For convenience of the following description, the distances calculated for the first memorized pattern A1 relative to the second through the fourth memorized patterns A2 to A4 and memorized in the similarity measure memory 22 will be represented by D12, D13, and D14, respectively. Those memorized for the second through the fourth memorized patterns A2 to A4 will be designated by D21, D23, ..., D41, D42, and D43. As will readily be understood, the memorized similarity measure $D_{mn}$ (each of m and n being representative of one of 1 through 4) is equal to the memorized similarity measure $D_{nm}$.

A similarity measure adder 26 is for calculating a sum of the memorized similarity measures calculated and memorized for each of the memorized patterns A1 through A4. More specifically, the adder 26 calculates a first sum for the first memorized pattern A1 by summing up the memorized similarity measures D12, D13, and D14. Likewise, second through fourth sums are calculated for the second through the fourth memorized patterns A2 to A4. For example, a sum of the memorized similarity measures D21, D23, and D24 is calculated for the second memorized pattern A2. The sums are temporarily stored in a sum memory 27 as first through fourth memorized sums D1, D2, D3, and D4. The memorized sums D1 through D4 are listed also in the Table.

For storage in the pattern memory 11, a selector selects that one of the memorized patterns A1 through A4 for which the memorized sum is a minimum of the memorized sums D1 through D4. In the example being illustrated, the selector comprises a comparator 31 for comparing the memorized sums D1 through D4 with one another to find the minimum of the memorized sums D1 through D4 and to produce a selection signal indicative of the above-mentioned one of the memorized patterns A1 through A4 as an indicated pattern $A_z$ (z being representative of one of 1 through 4). Responsive to the selection signal, a pattern storing unit 32 stores the indicated pattern $A_z$ in the pattern memory 11 as a reference pattern. For this purpose, the patterns memorized in the voice pattern memory 17 may preliminarily be transferred to the pattern storing unit 32. Alternatively, the pattern storing unit 32 may feed the selection signal back to the voice pattern memory 17 to fetch the indicated pattern $A_z$ from the memorized patterns A1 through A4 and to store the fetched pattern $A_z$ in the pattern memory 11.

For the example given in the Table, the first memorized sum D1 is the minimum of the memorized sums D1 through D4. The voice storing device therefore loads the pattern memory 11 with the first memorized pattern A1 which is selected from the memorized patterns A1 through A4. It will be understood from the operation of the speech recognizer described hereinabove that the voice storing device stores an excellent reference pattern in the pattern memory 11.

While a voice storing device according to a preferred embodiment of this invention has thus far been described, it will now be readily possible for one skilled in the art to develop various other embodiments of this invention. For example, it is possible to use a similarity measure calculator of the pattern recognizing system as the similarity measure calculator 21 and a work memory of the system as the memories 17, 22, and 27.

What is claimed is:

1. A pattern storing device for storing a reference pattern in a pattern memory of a pattern recognizing system, said pattern storing device comprising:
   pattern memory means for storing those at least three patterns as stored patterns from which said reference pattern should be selected, all of said at least three patterns representing the same speech sequence;
   similarity measure calculating means for calculating similarity measures for each of said stored patterns relative to others thereof, respectively;
   sum calculating means for calculating a sum of the similarity measures calculated for each of said stored patterns; and
   selecting means responsive to the sums calculated for said stored patterns, respectively, for selecting that one of said stored patterns as said reference pattern for which the sum is an extremum of the sums calculated for said stored patterns, said reference pattern selected by said selecting means being the most representative pattern of said at least three patterns stored in said pattern memory means.

2. A pattern storing device as claimed in claim 1, wherein said sum calculating means comprises means for storing the similarity measures calculated for said stored patterns, respectively, and means for calculating said sums by summing up the similarity measures stored for said stored patterns, respectively.

3. A pattern storing device as claimed in claim 1, wherein said selecting means comprises means for storing those sums as stored sums which are calculated for said stored patterns, respectively, and means for comparing said stored sums with one another to find said one of the stored patterns for which the sum is said extremum.

* * * * *

UNITED STATES PATENT AND TRADEMARK OFFICE
CERTIFICATE OF CORRECTION

PATENT NO. : 4,731,845

DATED : March 15, 1988

INVENTOR(S) : Matsuki et al

It is certified that error appears in the above-identified patent and that said Letters Patent is hereby corrected as shown below:

COLUMN 1, LINE 60    After "cases" insert --even--;

COLUMN 5, LINE 32    Delete "m" and insert --$\underline{m}$--;

COLUMN 5, LINE 60    Delete "z" and insert --$\underline{z}$--.

Signed and Sealed this

Eighth Day of November, 1988

Attest:

DONALD J. QUIGG

*Attesting Officer*    Commissioner of Patents and Trademarks